United States Patent [19]

Nielsen

[11] 4,351,669
[45] Sep. 28, 1982

[54] IMPREGNATING COMPOSITION, A PROCESS FOR ITS PREPARATION AND PRODUCTS PREPARED BY USING THE COMPOSITION

[76] Inventor: Hilmar R. Nielsen, Forvägen 7, S 145 51 Norsborg, Sweden

[21] Appl. No.: 177,474

[22] Filed: Aug. 12, 1980

[30] Foreign Application Priority Data

Aug. 16, 1979 [SE] Sweden .............................. 7906866

[51] Int. Cl.³ .................................................. C09D 5/20
[52] U.S. Cl. .......................................... 106/2; 106/13; 106/18.11; 106/18.12; 106/80; 106/81; 106/123 LC; 106/193 R; 106/194; 106/197 R; 106/203; 106/204; 106/213; 106/214; 252/607

[58] Field of Search .................. 106/15.05, 80, 81, 74, 106/75, 287.1, 197 R, 213, 123 LC, 2, 13, 18.12, 18.11, 163 R, 194, 193 R, 214, 203, 204; 252/607

[56] References Cited

U.S. PATENT DOCUMENTS 4,083,407 4/1978 Griffin ................................... 106/81

Primary Examiner—Lorenzo B. Hayes
Attorney, Agent, or Firm—Burns, Doane, Swecker & Mathis

[57] ABSTRACT

Impregnating composition containing the components:
(a) an alkaline extract of a lignocellulosic material;
(b) a high molecular carbohydrate; and
(c) an alkali or alkaline earth metal silicate or colloidal silica; a process for its preparation; and processes for the preparation of products by using the impregnating composition.

15 Claims, No Drawings

IMPREGNATING COMPOSITION, A PROCESS FOR ITS PREPARATION AND PRODUCTS PREPARED BY USING THE COMPOSITION

The present invention relates to an impregnating composition that can be used for impregnating for example cellulose-based materials so as to impart to same favourable characteristics regarding resistance, for example fire resistance, water resistance and freezing resistance. The invention also comprises a process for the preparation of said impregnating composition. Finally, the invention covers processes for the preparation of different products while using the impregnating composition according to the invention.

Frequently arising problems within the building industry are access to materials showing satisfactory resistance against the conditions to which they are exposed in practical use. Among such characteristics there may be mentioned fire resistance, water resistance, freezing resistance etc. In addition to the fact that the material shall possess favourable characteristics in this respect it must also be capable of competition from a certain point of view. During the last years many materials have been developed intended for use in for example the building industry, and it has been an aim to utilize to the maximum possible extent waste materials of different types, for example wood chips, barch waste and the like, which materials then are treated in a suitable manner to provide desired products by admixing different constituents imparting desirable characteristics to the material. Such synthetic or semi-synthetic materials have, however, all been found to be subject to deficiencies making them unusable for practical purposes.

The present invention has for its main object to provide an impregnating composition, the use of which makes possible utilization of relatively unqualified materials while resulting in products which are found to meet high requirements.

Another object of the invention is providing a process for the preparation of such impregnating composition.

Further objects of the invention are to provide processes for the preparation of different products, for example building elements, fire protective paints, etc.

The impregnating composition according to the instant invention contains in principle three components, namely:

(a) an alkaline extract of a lignocellulose material;
(b) a high molecular carbohydrate; and
(c) an alkali or alkaline earth metal silicate or colloidal silica.

COMPONENT (A)

This component of the impregnating composition according to the present invention thus consists of an alkaline extract of a lignocellulose material, preferably consisting of ordinary straw from barley, wheat, rye or the like. For the manufacture of this alkali extract there may be used alkalies of different strengths, for example 5–20%, and when using an alkali of a strength of 20% a suitable proportion has been found to be about 15–20 kgs of straw per 100 liters of alkali. By alkali there is primarily meant sodium hydroxide or potassium hydroxide, but it is also conceivable to use ammonium hydroxide, calcium hydroxide or barium hydroxide. Regarding further details concerning this alkali extract of lignocellulose material reference is had to published Swedish patent application 77-00110-5 which corresponds to U.S. Pat. No. 4,169,736. It should be noted that in the instant invention one may advantageously use an unneutralized alkali extract, cf. the patent application just mentioned.

Before use in connection with the preparation of the impregnating composition the alkali extract is diluted with water, and per part by volume of extract there is used 5–15 parts by volume of water. At lower dilution there are obtained unfavourable effects in the final use of the impregnating composition, for example a corrosive effect. At a more far-going dilution than that corresponding to about 15 parts by volume of water per part by volume of alkali extract there is not obtained a satisfactory fire protective effect, and also the compatibility of the high molecular carbohydrate material is impaired.

COMPONENT (B)

This component consists of a high molecular carbohydrate that may be for example cellulose or a cellulose derivative or starch. Among suitable cellulose derivatives there may be mentioned ethyl cellulose or a methyl cellulose or ethyl/methyl cellulose. Suitable derivatives are such containing about 47–48% methoxy or ethoxy units, i.e. with a degree of etherification corresponding to intermediates between two and three alkoxy groups per unit of glucose.

An alternative carbohydrate is starch, for example originating from potatoes (potato starch), corn, arrow root etc.

The proportion of high molecular carbohydrate of the composition is suitably about 100–300 grams per liter undiluted alkali extract. At amounts exceeding the upper limit the composition will be subject to thickening consistency, whereas at quantities below the lower limit the desirable stabilization of the alkali extract will not be obtained.

COMPONENT (C)

This component consists of an alkaline earth metal or alkali metal silicate or colloidal silicate, preferably sodium or potassium silicate in aqueous solution, for example of a concentration of Baumé 40°.

The alternative material is colloidal silica, preferably in the form of a colloidal solution, for example that sold under the trade name "Ludox".

With regard to aqueous solutions of the type water glass there is preferably used at least about 1 liter per 1 liter undiluted alkali extract, whereas the corresponding lower limit when using colloidal silica is about 180 grams calculated as $SiO_2$. When using solutions of the type water glass the upper limit is not particularly critical but a practical upper limit is about 5 liters per liter undiluted alkali extract. The upper limit when using colloidal silica is in practice more critical for the impregnating effect and lies at about 900 grams calculated as $SiO_2$ per liter undiluted alkali extract.

As previously indicated the invention also covers a process for the preparation of the impregnating composition, and in this process the alkali extract in diluted form is initially mixed with the high molecular carbohydrate, and the resulting mixture is allowed to stand and ripen until this constituents have been mutually dissolved. The mixture obtained is then brought together with a solution of alkaline earth metal or alkali metal silicate or colloidal silica to form the desired impregnating composition. The process can, of course, be applied to the preparation of all compositions, the different components of which fall within the scope of the definitions and proportions given above.

The invention also provides for processes for the preparation of different products while using the impregnation composition in question. Thus, within the scope of the invention, there may be provided a building element, whereby a material on cellulose base, for example saw dust, wood chips or the like or barch waste or any material originating from wood or log, is subjected to subpressure, and then, before release of the subpressure, the impregnating composition according to the invention is supplied, the composition being absorbed by the material, at least partly, when the subpressure is released. After drainage of possible excess of the composition cement in a suitable quantity is added to the mixture of material and composition. After admixing the mass of materials obtained may be molded under pressure to form a building element of the desired shape. In the material system obtained the hardening of the cement is based on the moisture of water supplied with the impregnating composition, and this means that the product can cure homogeneously so that the cement sets throughout all the mass.

An alternative product prepared while using the impregnating composition according to the invention is fire-protective paint, whereby the impregnating composition according to the invention is admixed with an alkyde resin, for example in the proportions 1-10 by volume, and then to the resulting solution or mixture there is added finely divided dolomite of microfineness, for example in a quantity of ¾ kgs per liter of mixture. The mass obtained is then admixed with pigment, for example of synthetic type, to the desired colour.

The invention will now be described with non-limiting examples, wherein percentages are based upon weight.

EXAMPLE 1

Preparation of impregnating composition

An alkali extract is prepared by treating 15 kgs of straw of wheat with 100 liters of 20% sodium hydroxide. After diluting the alkaline extract obtained with water 1:10 there is added per 10 liters of such diluted straw extract 200 grams of potato flour. Furthermore, there is added to this mixture colloidal silica of the type Ludox in an amount of 1.1 liter per 10 liters of diluted straw extract. These three constituents are admixed under stirring to form an impregnating composition ready for practical use.

EXAMPLE 2

Manufacture of fire protective building plate 100 liters saw dust (corresponding to about 13 kgs dry weight) are transferred to an autoclave where it is subjected to subpressure (vacuum) to 0.8-0.9 bar.

While maintaining the subpressure the autoclave is then charged with 40 liters of an impregnating composition prepared as per Example 1 above. Stirring is performed so that the saw dust absorbs the major part of the composition, the excess being allowed to drain off. About 10 liters of the impregnating composition is hereby drained from the saw dust and may be reused.

The wet saw dust is transferred to a mixture and supplied with cement in an amount of about 30 kgs per 100 liters of saw dust. The quantity shall be sufficient to evenly coat the saw dust grains.

This finished saw dust-cement mixture is then pressed in a press at a pressure of about 120 tons per m² while forming a building plate having the dimensions 1200×2500 mms. The moisture expelled from the saw dust under the pressing operation hereby initiates hardening of the cement so that binding will be obtained both in dependence of cement and of straw extract. There is obtained a hard and tough building plate which, when subjected to fire protective testing, is found to have a very high fire resistance. Not until about 45 minutes of testing under so-called standard fire conditions the surface layer starts to crack and to become brittle. The element must be considered as incombustible and is therefore very fireproof in practical use.

EXAMPLE 3

Manufacture of fire protective paint

In this application the same impregnating composition as per Example 1 is used with the exception that the amount of potato flour has been increased from 200 grams to 280 grams per 10 liters of diluted straw extract.

This modified impregnating composition is admixed with 10 times its volume of an alkyde resin [W. W. Harts (Malmsten & Bergvall)], which enters into intimate admixture with the base composition. To the solution or mixture obtained there is added finely divided dolomite (microfiller of the type Ernströms dolomite) in an amount of about 750 grams per liter, and pigment of the desired colour.

While using the fire protective paint hereby obtained building or apparatus details may be coated to obtain a surface coating resisting high temperatures and having at the same time an attractive appearance.

With regard to the building plate disclosed in Example 2 said plate shows very favourable characteristics in view of the application of the art of the invention. One can say that the starting saw dust by the treatment performed will be wholly dead or preserved in that the wood characteristics will not at all be found in the final product and the wood can neither grow mouldy, nor rot, in view of which the final building plate obtains characteristics fully corresponding to an inorganic dead material.

An alternative use of the impregnating composition according to the present invention is to admix with burnt magnesite, i.e. magnesium oxide, and thereby a composition will be obtained which can be used for coating electric cables or combustible details of wood or paper, and after said coating has been executed the material coated will no longer be combustible, i.e. fire cannot spread throughout the material in the same manner as before the coating.

The common denominator in applications of this disclosure is the base composition or impregnating composition described and consisting of alkaline extract, high molecular carbohydrate and alkali metal or alkaline earth metal silicate or colloidal silica.

I claim:

1. An impregnating composition suitable for use in imparting fire, water and freezing resistance to cellulose-based materials comprised of the following components:
   (a) an alkaline extract formed by contacting an alkali with a lignocellulose material;
   (b) a high molecular weight carbohydrate; and
   (c) an alkali or alkaline earth metal silicate or colloidal silica.

2. The impregnating composition of claim 1 comprising:
   (a) about 1 liter of said alkaline extract diluted with water to 5 to 15 times its volume;
   (b) about 100 to 300 grams of said high molecular weight carbohydrate; and
   (c) at least about 1 liter of alkali or alkaline earth metal silicate or at least about 180 grams of colloidal silica.

3. The impregnating composition of claim 2 wherein component (a) comprises an alkaline extract of straw.

4. The impregnating composition of claim 2 wherein component (b) comprises cellulose.

5. The impregnating composition of claim 2 wherein component (c) comprises potassium or sodium silicate.

6. The impregnating composition of claim 1 wherein component (a) is selected from the group consisting of cellulose, a cellulose derivative and starch.

7. The impregnating composition of claim 6 wherein said starch is selected from the group consisting of potato and corn starch.

8. A process for the preparation of an impregnating composition comprising the following components:
   (a) an alkaline extract formed by contacting an alkali with a lignocellulose material;
   (b) a high molecular weight carbohydrate; and
   (c) an alkali or alkaline earth metal silicate or colloidal silica, said process comprising admixing said alkaline extract with said high molecular weight carbohydrate such that said carbohydrate is dissolved therein, and subsequently combining said admixture with said alkali or alkaline earth silicate or colloidal silica.

9. The process of claim 8 wherein component (a) comprises an alkaline extract of straw.

10. The process of claim 8 wherein component (b) comprises cellulose.

11. The process of claim 8 wherein component (c) comprises potassium or sodium silicate.

12. The process of claim 8 wherein component (b) is selected from the group consisting of cellulose, cellulose derivatives and starch.

13. The process of claim 8 wherein said starch is selected from the group consisting of potato and corn starch.

14. The process of claim 8 wherein component (b) is selected from the group consisting of ethyl or methyl cellulose.

15. A process for the manufacture of a coating composition comprising admixing magnesium oxide with a composition comprised of the following components:
   (a) an alkaline extract formed by contacting an alkali with a lignocellulose material;
   (b) a high molecular weight carbohydrate; and
   (c) an alkaline or alkaline earth metal silicate or colloidal silica.

* * * * *